United States Patent Office 3,274,219
Patented Sept. 20, 1966

3,274,219
4α,8α,14β-TRIMETHYL-12,16-ANDROSTADIENES
Gerald W. Krakower, Elizabeth, N.J., assignor to Olin Mathieson Chemical Corporation, New York, N.Y., a corporation of Virginia
No Drawing. Filed Sept. 16, 1964, Ser. No. 397,034
3 Claims. (Cl. 260—397.45)

This invention relates to and has as its object the provision of new physiologically active steroids, novel methods for their production and new intermediates useful in said preparation. More particularly, this invention relates to the preparation of compounds of the formula

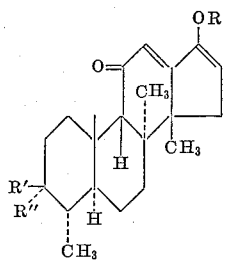

wherein R is acyl; R' is hydrogen; R" is acyloxy and together R' and R" is oxo (O=).

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The final products of this invention are physiologically active steroids which possess androgenic activity and may be used in the place of such known androgenically active steroids as testosterone in the treatment of eunuchoidism being formulated for such administration in the same manner and/or dosage as testosterone.

The final compounds of this invention may be prepared according to the processes of this invention which may be represented by the following equations wherein R, R' and R" are as hereinbefore defined.

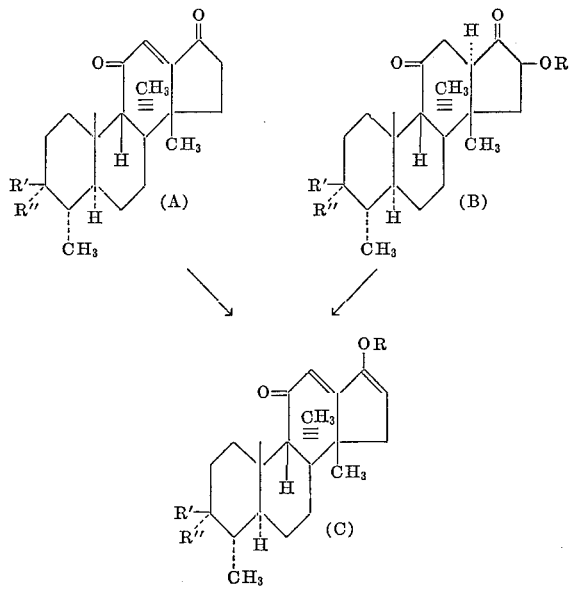

In the first step of the process of this invention, the 3,11,17-triketo-androstene starting material (Compounds A, wherein R'+R"=O=) may be acylated, as by treatment with an acylating agent, such as an acid anhydride or an acyl chloride in a basic medium to yield the 17-acyloxy-3,11-diketo-androstadiene derivatives (Compounds C), which are new final products of this invention.

Alternatively, the 3-acyloxy-11,17-diketo-androstene starting materials (Compounds A, wherein R" is acyloxy) may also be acylated in a like manner to yield the 3,17-diacyloxy-androstadiene derivatives (Compounds C), which are also new final products of this invention. The final products of this invention may also be prepared by treating the 3,16-diacyloxy-11,17-diketo-androstene starting materials (Compounds B, wherein R is acyl) with an alkali metal hydroxide and acylating the resultant product, as by treatment with an acylating agent, for example, an acid anhydride or an acyl halide in a basic medium, to yield the 3,17-diacyloxy-11-keto-androstadienes (Compounds C), which are also new final products of this invention.

The starting materials employed in the practice of the instant invention may be prepared in accordance with the teachings found in Comptes Rendus, volume 258, pages 3491 to 3494 (April 1, 1964), [see specifically the preparation of Compound 9 at page 3491]; Tetrahedron, volume 18, pages 1029 to 1048 (1962) [see specifically the preparation of Compound XXII on page 1034]. Explanation and clarification of the structural formulas and stereochemistry of the compounds prepared in the Tetrahedron article may be found in Experientia, volume 19, pages 521 and 522 (1963), and Experientia, volume 20, pages 344 to 347 (1964).

The invention may be further illustrated by the following examples:

EXAMPLE 1

*17-acetoxy-4α,8,14-trimethyl-18-nor-12,16-
5α,8α,9β,14β-androstadiene-3,11-dione*

A solution of 127 mg. of 4α,8,14-trimethyl-18-nor-12-5α,8α,9β,14β-androstene-3,11,17-trione in 2 ml. of pyridine and 1 ml. of acetic anhydride is left overnight at room temperature. The excess acetic anhydride is decomposed with water and the mixture evaporated. The resulting residue is purified by thin layer chromatography on Activity-V alumina. The ultraviolet absorbing band is eluted with ethyl acetate to give 112 mg. of 17-acetoxy-4α,8,14 - trimethyl - 18 - nor - 12,16 - 5α,8α,9β,14β-androstadiene-3,11-dione. Recrystallization from methanol gives analytically pure material, M.P. 152–153° C.;

$$\lambda_{max.}^{EtOH}\ 290\ m\mu,\ \epsilon=17{,}200$$

NMR (CDCl$_3$), triplet at 3.61τ, J=1 (1H), singlet at 4.26τ (1H), singlet at 7.77τ (3H).

*Analysis.*—Calc'd for C$_{23}$H$_{30}$O$_4$: C, 74.56; H, 8.16. Found: C, 74.63; H, 8.28.

EXAMPLE 2

*3α,17-diacetoxy-4α,8,14-trimethyl-18-nor-12,16-
5α,8α,9β,14β-androstadiene-11-one*

Following the procedure of Example 1, 3α-acetoxy-4α,8,14 trimethyl - 18 - nor - 12 - 5α,8α,9β,14β - androstene-11,17-dione is converted to 3α,17-diacetoxy-4α, 8,14 - trimethyl - 18 - nor - 12,16 - 5α,8α,9β,14β - androstadiene-11-one, M.P. 164–165° C.; [α]$_D^{29}$ —200°;

$$\lambda_{max.}^{EtOH}\ 293\ m\mu\ \epsilon=14{,}800$$

NMR (CDCl$_3$), triplet at 3.68τ, J=1 (1H), singlet at 4.27τ (1H), singlet at 7.78τ (3H), singlet at 7.96τ (3H).

*Analysis.*—Calc'd for C$_{25}$H$_{34}$O$_5$: C, 72.43; H, 8.27. Found: C, 72.56; H, 8.30.

EXAMPLE 3

*3α,17-diacetoxy-4α,8,14-trimethyl-18-nor-12,16-5α,8α,9β,14β-androstadiene-11-one*

A solution of 165 mg. of 3α,16β-diacetoxy-4α,8,14-trimethyl - 18 - nor - 5α,8α,9β,13α,14β - androstane - 11,17-dione in 1 ml. of ethanol is warmed on the steam bath and after the addition of 1 ml. of 5% sodium hydroxide is immediately cooled in an ice-bath. After two minutes the red solution is acidified with 5% hydrochloric acid. The solvent is evaporated and the residue dissolved in chloroform, washed with water until neutral, dried and evaporated. The resulting material is dissolved in 2 ml. of pyridine and 1 ml. of acetic anhydride and kept at room temperature overnight. After decomposition with water and evaporation the residue weighs 148 mg. Purification by thin layer chromatography on Activity-V alumina, and elution of the ultraviolet absorbing band with ethyl acetate gives 49 mg. of 3α,17-diacetoxy-4α,8,14-trimethyl - 18 - nor - 12,16 - 5α,8α,9β,13α,14β - androstadiene-11-one. Crystallization from methanol gives material M.P. 164–165°, and identical with that obtained in Example 2.

The invention may be variously otherwise embodied within the scope of the appended claims.

What is claimed is:
1. A compound of the formula

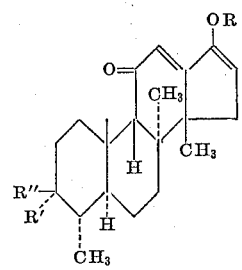

wherein R is acyl, wherein the acyl radical is of a hydrocarbon carboxylic acid of less than twelve carbon atoms; R″ is hydrogen; R′ is acyloxy wherein the acyl radical is of a hydrocarbon carboxylic acid of less than twelve carbon atoms; and together R′ and R″ is oxo (O=).

2. 17 - acetoxy - 4α,8,14 - trimethyl - 18 - nor - 12,16-5α,8α,9β,14β-androstadiene-3,11-dione.

3. 3α,17 - diacetoxy - 4α,8,14 - trimethyl - 18 - nor - 12,16-5α,8α,9β,14β-androstadiene-11-one.

No references cited.

LEWIS GOTTS, *Primary Examiner.*

ELBERT L. ROBERTS, *Assistant Examiner.*

UNITED STATES PATENT OFFICE
CERTIFICATE OF CORRECTION

Patent No. 3,274,219 September 20, 1966

Gerald W. Krakower

It is hereby certified that error appears in the above numbered patent requiring correction and that the said Letters Patent should read as corrected below.

In the heading to the printed specification, lines 3 to 5, for "assignor to Olin Mathieson Chemical Corporation, New York, N. Y., a corporation of Virginia" read -- assignor, by mesne assignments, to E. R. Squibb & Sons, Inc., New York, N. Y., a corporation of Delaware --.

Signed and sealed this 29th day of August 1967.

(SEAL)
Attest:

ERNEST W. SWIBER
Attesting Officer

EDWARD J. BRENNER
Commissioner of Patents